(12) United States Patent
Huang et al.

(10) Patent No.: US 9,109,963 B2
(45) Date of Patent: Aug. 18, 2015

(54) PRESSURE AND SHEAR FORCE MEASUREMENT DEVICE AND METHOD

(71) Applicant: National Chiao Tung University, Hsinchu (TW)

(72) Inventors: Cheng-Sheng Huang, Hsinchu (TW); Bing-Shiang Yang, Hsinchu (TW); Wen-Yea Jang, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 14/090,619

(22) Filed: Nov. 26, 2013

(65) Prior Publication Data

US 2014/0182391 A1    Jul. 3, 2014

(30) Foreign Application Priority Data

Dec. 28, 2012    (TW) .............................. 101150921 A

(51) Int. Cl.
| | | |
|---|---|---|
| *G01L 1/24* | (2006.01) | |
| *G01L 5/22* | (2006.01) | |
| *G01L 1/00* | (2006.01) | |
| *G01L 5/16* | (2006.01) | |

(52) U.S. Cl.
CPC ... *G01L 1/00* (2013.01); *G01L 1/24* (2013.01); *G01L 1/247* (2013.01); *G01L 5/166* (2013.01); *G01L 5/228* (2013.01)

(58) Field of Classification Search
CPC ........... G01L 1/24; G01L 1/247; G01L 5/228; G01L 5/166

USPC .......... 73/818, 841, 800, 762, 763, 767, 768, 73/774, 819, 862.041–862.046, 862.621, 73/862.624, 862.625, 862.636–862.638; 356/35; 250/208.1

See application file for complete search history.

(56) References Cited

U.S. PATENT DOCUMENTS

| | | | |
|---|---|---|---|
| 4,599,908 A * | 7/1986 | Sheridan et al. ......... 73/862.046 |
| 6,909,084 B2 * | 6/2005 | Tachi et al. .................... 250/221 |
| 7,307,702 B1 * | 12/2007 | Mathur et al. .................. 356/32 |
| 7,420,155 B2 * | 9/2008 | Mizota et al. ................. 250/221 |
| 7,659,502 B2 * | 2/2010 | Tachi et al. .................... 250/221 |
| 7,918,142 B1 * | 4/2011 | Tarler .............................. 73/841 |
| 8,091,437 B2 * | 1/2012 | Stumpf .................... 73/862.041 |
| 8,780,335 B2 * | 7/2014 | Van Steenberge et al. ..... 356/32 |
| 2007/0040107 A1 * | 2/2007 | Mizota et al. ................. 250/221 |
| 2008/0245955 A1 * | 10/2008 | Tachi et al. .................... 250/221 |
| 2009/0272206 A1 * | 11/2009 | Stumpf ........................ 73/866.5 |
| 2013/0036829 A1 * | 2/2013 | Van Steenberge et al. ..... 73/800 |

* cited by examiner

*Primary Examiner* — Lisa Caputo
*Assistant Examiner* — Jonathan Dunlap
(74) *Attorney, Agent, or Firm* — Mintz Levin Cohn Ferris Glovsky and Popeo, P.C.; Peter F. Corless; Steven M. Jensen

(57) ABSTRACT

A pressure and shear force measurement device and a pressure and shear force measurement method are disclosed. The measurement device includes a flexible substrate; a plurality of signal outputting units embedded in the flexible substrate for outputting signals; and a plurality of signal detectors disposed at a peripheral of the flexible substrate for receiving at least a signal outputted from the signal outputting units, wherein when the flexible substrate has a load applied thereon and each of the signal outputting units has a displacement, each of the signal detectors detects a pressure and a shear force resulting from the load on the flexible substrate based on the signal received from the signal outputting units.

5 Claims, 5 Drawing Sheets

PRESSURE AND SHEAR FORCE MEASUREMENT DEVICE AND METHOD

CROSS-REFERENCES TO RELATED APPLICATIONS

This application claims under 35 U.S.C. §119(a) the benefit of Taiwanese Application No. 101150921, filed Dec. 28, 2012, the entire contents of which is incorporated herein by reference.

BACKGROUND OF THE INVENTION

1. Field of the Invention

The present invention relates to a measurement device, and more particularly, to a measurement device and a measurement method for simultaneously measuring pressure and shear force.

2. Description of Related Art

Pressure is force per unit area applied in a direction perpendicular to a surface of an object. Shear force is force applied tangentially to the surface that causes sliding or torsional deformation. Since shear force is applied parallel to an action plane, it is also called tangential force.

Shear force may be measured by a magneto-resistive device and a capacitive device. A magneto-resistive device may measure variation of the shear force by a suspended magnet and magneto-resistive material. The magnet and the magneto-resistive material are placed in two layers respectively. A change of resistance can be used to calculate the change of the relative position, so as to infer the applied shear force. As for the capacitive device, the shear force can be measured by the variation of the internal capacitance value. An upper electrode and a lower electrode are included within the capacitive device. The upper electrode and the lower electrode are isolated by an insulator. The change in relative positions of the upper electrode and the lower electrode is calculated based on the capacitance values, and the applied shear force is thus inferred by the change in the relative positions.

During measuring the pressure and the shear force, the pressure and the shear force are measured separately. Currently, the pressure and the shear force on an object to be measured can not be detected simultaneously by a device or a method.

Moreover, since the conventional technique that measure pressure and shear force rely on electrical signals, consequently, the circuitry and transducer are coupled together. However, when any component of the device is damaged, the overall device will not be actuated and must be replaced as a whole, and thus the cost will be increased.

Therefore, there is a need for simultaneously measuring the pressure and the shear force on an object for the industrial application.

SUMMARY OF THE INVENTION

The present invention provides a pressure and shear force measurement device and a pressure and shear force measurement method for simultaneously measuring pressure, shear force, and a distribution of pressure and shear force on an object to be measured.

The present invention provides a pressure and shear force measurement device, comprising a flexible substrate; a plurality of signal outputting units and a plurality of signal detectors. The signal outputting units are embedded in the flexible substrate for outputting signals. The signal detectors are disposed at the peripheral of the flexible substrate for receiving the signal outputted from the signal outputting units. When, the flexible substrate is subjected to a load and each of the signal outputting units experiences a displacement, each of the signal detectors measures the pressure and the shear force exerted on the flexible substrate by the load based on the signal received from the signal outputting units.

The present invention further provides a pressure and shear force measurement method, comprising the steps of: (1) embedding in a flexible substrate a plurality of signal outputting units for outputting signals and disposing a plurality of signal detectors at the peripheral of the flexible substrate; (2) producing a displacement of each of the signal outputting units when the flexible substrate is subjected to a load; and (3) receiving signals outputted from the signal outputting units by the signal detectors, and measuring a pressure and a shear force exerted on the flexible substrate by the load based on the signal received by the signal outputting units.

In light of the above descriptions, the present invention is capable of measuring both the magnitude as well as the distribution of the pressure and shear force of the flexible substrate based on the displacement resulting from the applied load.

Hence, the present invention achieves measuring the pressure and shear force simultaneously.

Further, the pressure and shear force measurement device of the present invention is provided without the need of electrical circuitry. Furthermore, the flexible substrate and the signal detectors are separated, such that when any component of the pressure and shear force measurement device is damaged, the damaged component may be replaced separately without replacing the entire device, and consumption of the material cost can be reduced effectively.

BRIEF DESCRIPTION OF DRAWINGS

The following illustrative embodiments are provided to illustrate the disclosure of the present invention and its advantages, these and other advantages and effects being apparent to those in the art after reading this specification.

DETAILED DESCRIPTIONS OF EMBODIMENTS

These detailed descriptions may include exemplary embodiments in an example manner with respect to structures and/or functions and thus a scope of the present disclosure should not be construed to be limited to such embodiments. In other words, the present disclosure may be embodied in many different forms and should not be construed as limited to the embodiments set forth herein. Rather, these embodiments are provided so that this disclosure will be thorough and complete, and will fully convey the scope of the disclosure to those skilled in the art. The present disclosure is defined only by the categories of the claims, and a scope of the present disclosure may include all equivalents to embody a spirit and idea of the present disclosure.

The terminology used in the present disclosure is for the purpose of describing particular embodiments only and is not intended to limit the disclosure. For example, the terminology used in the present disclosure may be construed as follows.

As used in the disclosure and the appended claims, the singular forms "a", "an" and "the" are intended to include the plural forms as well, unless context clearly indicates otherwise. It will be further understood that the terms "comprise" and/or "comprising and/or "include" and/or "including" and/ or "have" and/or "having"" when used in this specification, specify the presence of stated features, integers, steps, operations, elements, and/or components, but do not preclude the presence or addition of one or more other features, integers, steps, operations, elements, components, and/or groups thereof.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
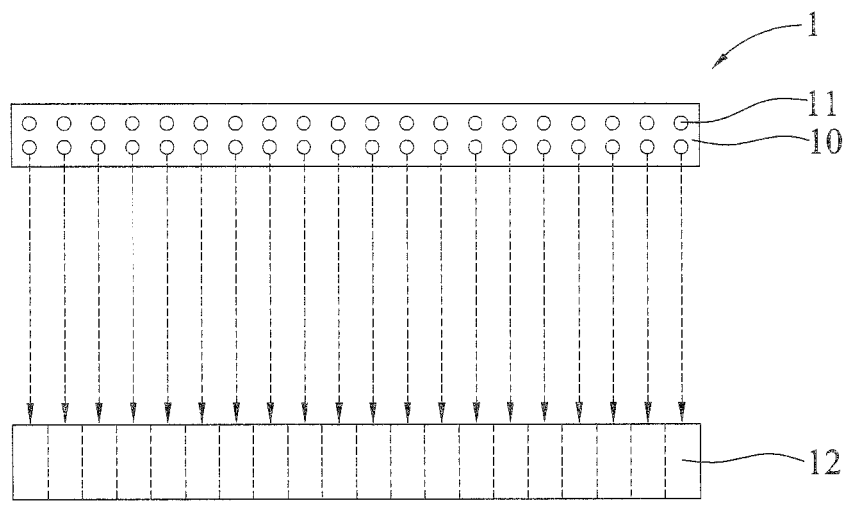
FIG. 1 is a schematic view showing a pressure and shear force measurement device according to a first embodiment of the present invention.
Figure 2:
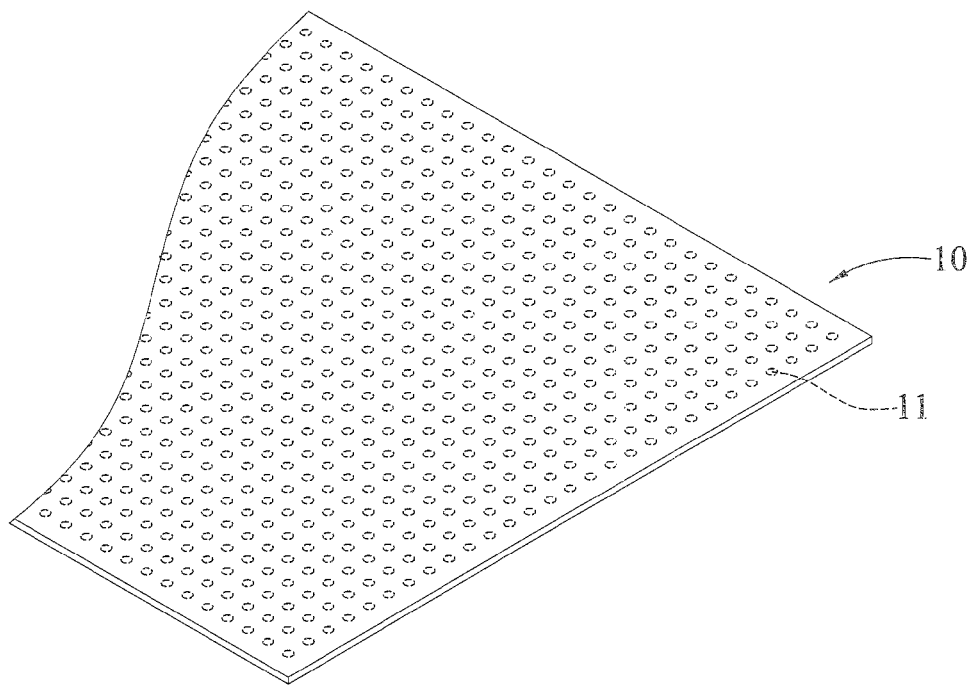
FIG. 2 is a schematic view showing the arrangement of signal outputting units according to the present invention.

Referring to FIGS. 1 and 2, FIG. 1 is a schematic view showing a pressure and shear force measurement device according to a first embodiment of the present invention, and FIG. 2 is a schematic view showing the arrangement of the signal outputting units. The pressure and shear force measurement device 1 of the present invention includes a flexible substrate 10, a plurality of signal outputting units 11, and a plurality of signal detectors 12.

The plurality of signal outputting units 11 are embedded in the flexible substrate 10 for outputting signal. The signal outputting units 11 may emit light signal initiatively, or may emit signal passively by external energy. The plurality of signal outputting units 11 described herein refer to the plurality of signal outputting units 11 for outputting signal distributed on the same plane in the flexible substrate 10. The plurality of signal outputting units 11 distributed on the same plane may be on one layer or more layers in the present invention.

The signal detectors 12 are placed at the peripheral of the flexible substrate 10, for respectively receiving the signals outputted from the plurality of signal outputting units 11. When a load is applied on the flexible substrate 10 to move the plurality of signal outputting units 11, the plurality of signal detectors 12 detect the pressure and shear force applied on the flexible substrate 10 based on the signals respectively received by the signal outputting units. The positions of the plurality of signal detectors 12 may correspond to the plurality of signal outputting units 11 optionally.

The plurality of signal outputting units 11 are disposed in, but not limited to be disposed in, two layers in the figures. The signal outputting units 11 can be disposed in a single layer, two or more layers according to the circumstances in the implementation.

Figure 3A:
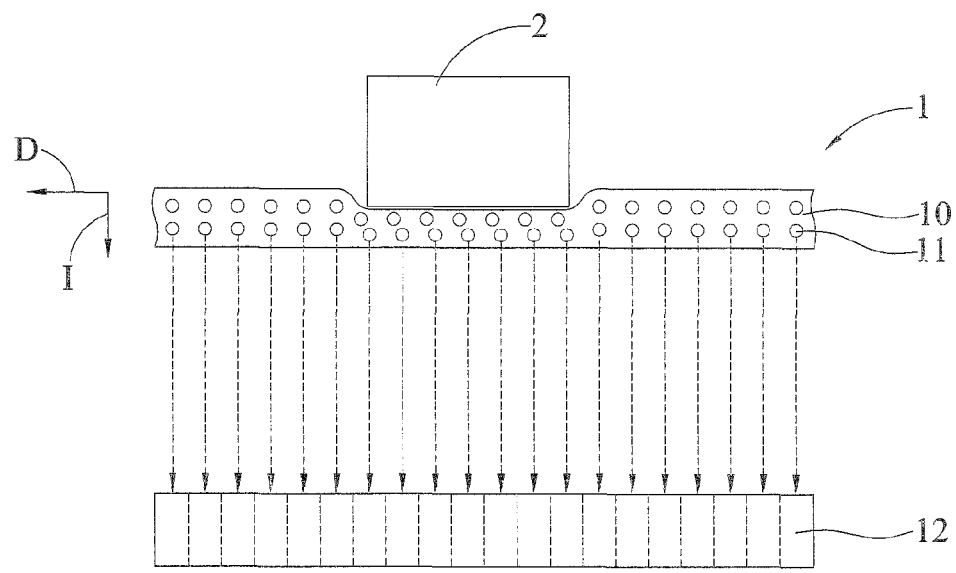
FIG. 3A is a schematic view showing the implement of a pressure and shear force measurement device according to the first embodiment of the present invention.
Figure 3B:
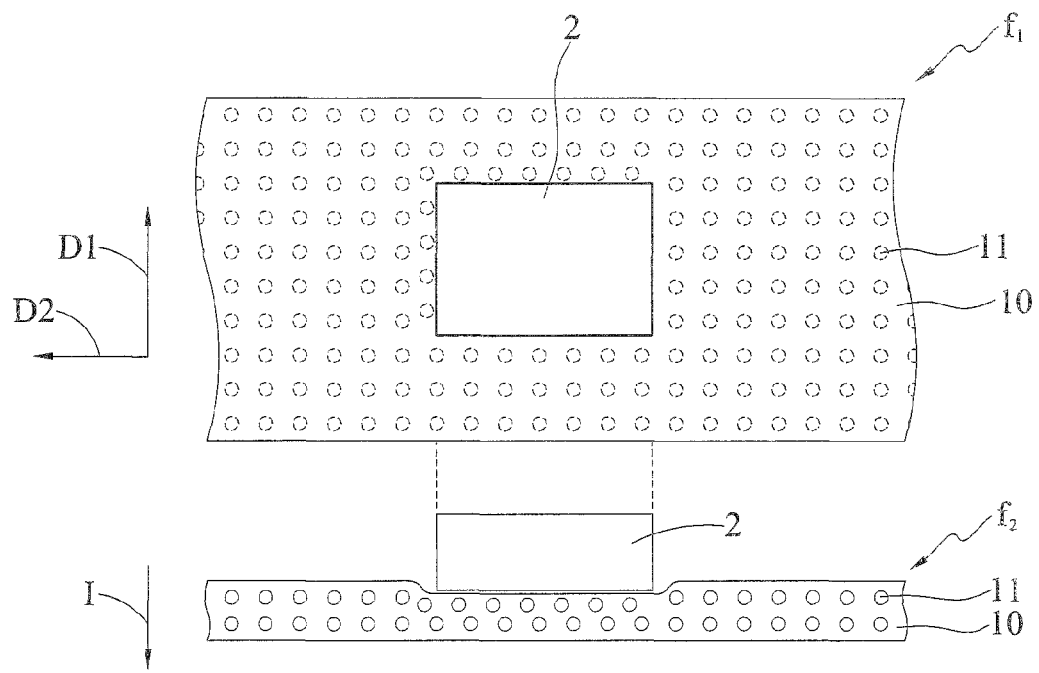
FIG. 3B is a schematic view showing the distribution of pressure and shear force on a flexible substrate according to the present invention.

Referring to FIGS. 3A and 3B, FIG. 3A is a schematic view showing a pressure and shear force measurement device according to a first embodiment of the present invention, and FIG. 3B is a schematic view showing the distribution of pressure and shear force on a flexible substrate.

As shown in FIGS. 3A and 3B, the pressure and shear force measurement device 1 of the present invention outputs signals by the plurality of signal outputting units 11 embedded in the flexible substrate 10, and the plurality of signal detectors 12 respectively receive signals outputted from the signal outputting units 11, to detect the positions of the plurality of signal outputting units 11. In the present embodiment, the signal outputting units 11 are signal generators. The signal outputting units 11 may be, but not limited to, infrared outputting units, and can generate and output signals to the plurality of signal detectors 12.

During measuring the pressure and shear force, a load 2 is applied on the flexible substrate 10 for generating the pressure at the radial direction I as well as the shear force at the axial direction D on the flexible substrate 10. At this time, the flexible substrate 10 is deformed because of the pressure and shear force resulting from the load 2, such that the signal outputting units 11 embedded in the flexible substrate 10 have displacements at the radial direction I and the axial direction D.

FIG. 3B shows a top view f1 and a side view f2 of the flexible substrate 10, showing the distribution of the pressure and shear force on the flexible substrate 10 when the load 2 is applied on the surface of the flexible substrate 10. As shown in FIG. 3B, when the load 2 is applied on the flexible substrate 10, the load 2 generates the pressure at the radial direction I perpendicular to the flexible substrate 10 and the shear force at the axial direction on the flexible substrate 10, such that the signal outputting units 11 have displacements corresponding to the pressure at the radial directions and the shear force at the axial direction. The shear force on the flexible substrate 10 may include a first component D1 and a second component D2.

In order to present the displacement of the signal outputting units 11 in the flexible substrate 10 withstanding a load, FIG. 3A shows the side view of the signal outputting units 11 and the flexible substrate 10, and the shear force resulting from the load 2 on the flexible substrate 10 is indicated by D in FIG. 3A.

Since the signal outputting units 11 output signals to the plurality of signal detectors 12, the intensity or distribution of the signals received by the plurality of signal detectors 12 will be changed due to the displacement of the signal outputting units 11, and thus the pressure and shear force resulting from the load 2 applied on the flexible substrate 10 can be calculated. Simultaneously, by the displacements of the plurality of signal outputting units 11, distribution of the pressure and shear force can be obtained. In detail, according to the strength of the signal received by the signal detectors 12, the pressure and the pressure distribution on the flexible substrate 10 can be obtained. Moreover, based on the orientation of the signal received by the signal detectors 12, the shear force and the shear force distribution on the flexible substrate 10 can be obtained.

Figure 4:
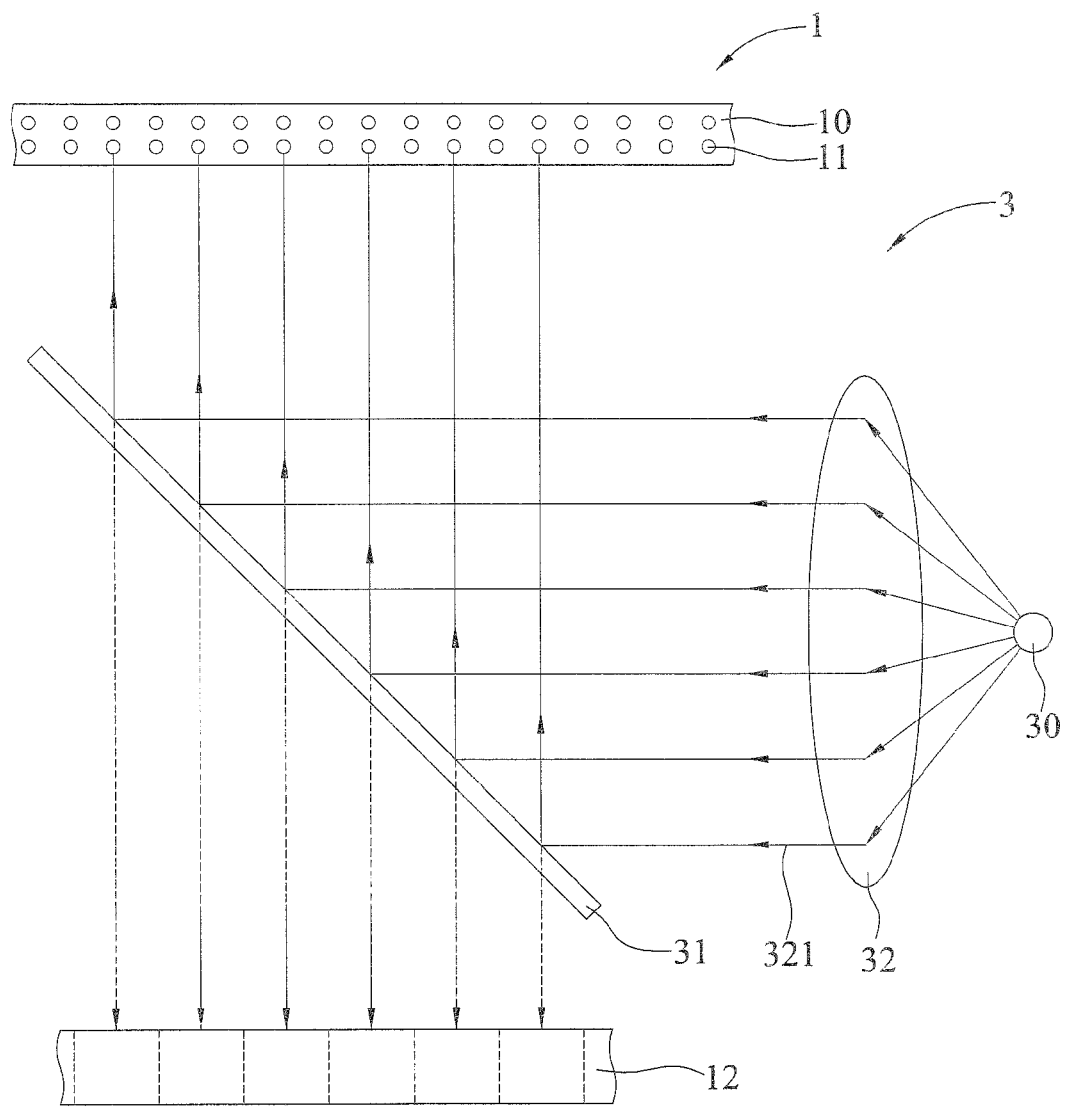
FIG. 4 is a schematic view showing a pressure and shear force measurement device according to a second embodiment of the present invention.
Figure 5:
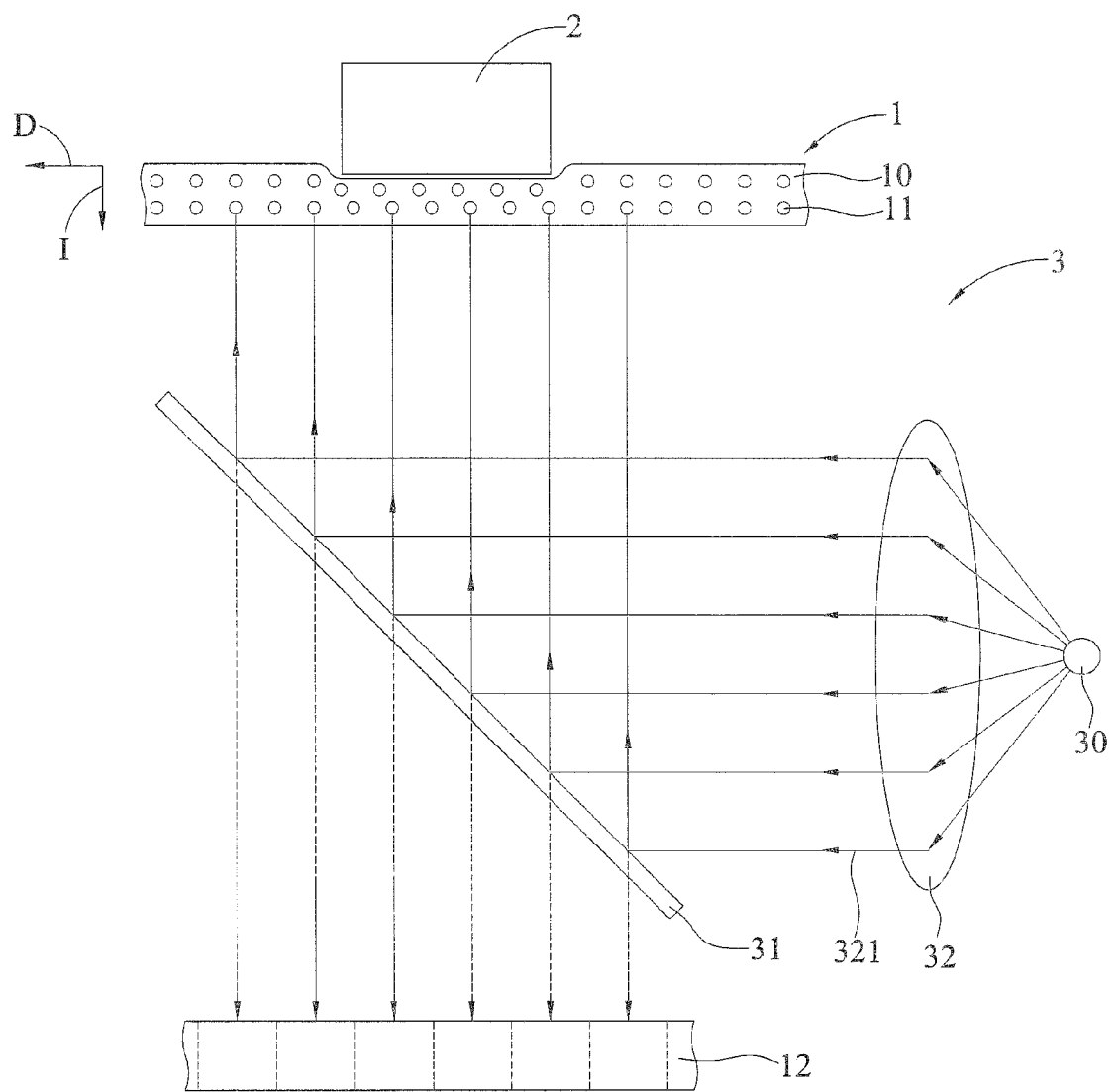
FIG. 5 is a schematic view showing the measurement of the pressure and shear force measurement of the second embodiment of the present invention.
Figure 6:
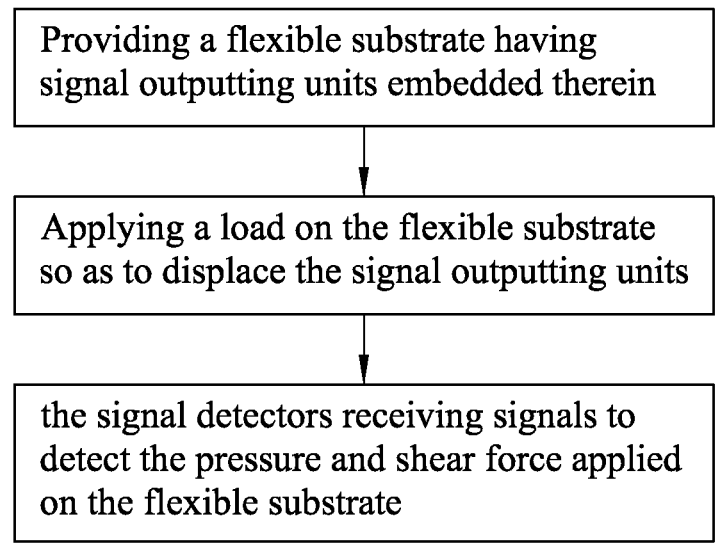
FIG. 6 is a flow diagram showing a pressure and shear force measurement method according to the present invention.

FIG. 4 is a schematic view showing a pressure and shear force measurement device according to a second embodiment of the present invention. FIG. 5 is a schematic view showing the measurement of the pressure and shear force according to the second embodiment of the present invention. As shown in FIGS. 4 and 5, the pressure and shear force measurement device of this embodiment is similar to that of the first embodiment, and the same reference numerals are used for indicating the same elements. The differences between the first embodiment and the second embodiment are that the signal outputting units 11 of the second embodiment are radiators for absorbing the light source to radiate the light signal to the plurality of signal detectors 12. As shown in FIGS. 5 and 6, the pressure and shear force measurement device 3 further comprises a light source unit 30 and a filter 31. The filter 31 may be a dichroic mirror, for example. The light source unit 30 is used for outputting the light source to the signal outputting units 11, such that the signal outputting units 11 absorb the light source to radiate the light signal to the plurality of signal detectors 12. The filter 31 is placed between the signal outputting units 11 and the signal detectors 12 for reflecting the light source outputted by the light source unit 30 to the signal outputting units 11 and transmitting the light signal radiated by the signal outputting units 11 to the signal detectors 12.

When the pressure and shear force measurement device 3 is implemented, the light source unit 30 outputs the light, the light is reflected to the signal outputting units 11 through the filter 31, such that the signal outputting units 11 absorb the light and radiate the light signal, and the light signal radiated by the signal outputting units 11 can be transmitted to the signal detectors 12 by penetrating the filter 31.

The method of measuring the pressure and the shear force in this embodiment is similar to that of the first embodiment. The load 2 is applied on the flexible substrate 10, and the load 2 results in the pressure at the radial direction I and the shear force at the axial direction on the flexible substrate 10, such that the signal outputting units 11 have displacements, the strength or orientation of the signal received by the plurality of signal detectors 12 changes due to the displacement of the signal outputting units 11, and then the pressure and the shear force on the flexible substrate 10 are calculated. Meanwhile, the distribution of the pressure and the shear force can be obtained from the displacement of the signal outputting units 11.

When the load 2 is applied on the flexible substrate 10, the shear force at the axial direction D resulting from the load 2 on the flexible substrate 10 includes the first component D1 and the second component D2. In FIG. 5, in order to depict the displacement of the plurality signal outputting units 11 on the flexible substrate 10, the shear force at the axial direction resulting from the load 2 on the flexible substrate 10 is indicated by D.

It is noted that since the light from the light source unit 30 is radiated to the surrounding, in order to centralize and project the light source from the light source unit 30 onto the signal outputting units 11, a collimator 32 is disposed between the light source unit 30 and the filter 31 in the present embodiment for correcting the optical path 321 between the light source unit 30 and the filter 31.

FIG. 6 is a flow diagram showing a pressure and shear force measurement method according to the present invention. As shown in FIG. 6, at step S1, signal outputting units for outputting signal are embedded in a flexible substrate, and signal detectors are disposed at the peripheral of the flexible substrate. Next, at step S2, the signal outputting units may be signal generators for generating and outputting signals. The signal outputting units may be radiators for absorbing the light and radiating the light signal.

At step S2, a load is applied on the flexible substrate and thus the signal outputting units have a displacement. Then, step S3 is performed.

At step S3, the signal detectors at the peripheral of the flexible substrate receive the signals outputted by the signal outputting units, and measure the pressure and shear force resulting from the load on the flexible substrate based on the signals received by the signal outputting units.

In addition to detecting the pressure and shear force, the signal detectors may detect the distribution of the pressure and shear force resulting from the load on the flexible substrate.

In summary, in the pressure and shear force measurement device and the pressure and shear force measurement method of the present invention, a load is applied on a flexible substrate having signal outputting units embedded therein, and the signal outputting units in the flexible substrate have a displacement due to the load, such that the strength and the direction of the signal received by the signal detectors at the peripheral of the flexible substrate are also changed, and thus the changes of the pressure and shear force are detected. For example, when a person stands on the flexible substrate, the pressure and shear force resulting from the feet of the person on the flexible substrate can be measured. The pressure and shear force measurement device and the pressure and shear force measurement method can be used in various engineering fields for measuring the pressure and shear force simultaneously.

The above-described descriptions of the detailed embodiments are to illustrate the preferred implementation according to the present invention, and are not intended to limit the scope of the present invention. Accordingly, many modifications and variations completed by those with ordinary skill in the art will fall within the scope of present invention as defined by the appended claims.

What is claimed is:

1. A pressure and shear force measurement device, comprising:
    a flexible substrate;
    a plurality of signal outputting units disposed in the flexible substrate for outputting signals;
    a plurality of signal detectors disposed at a periphery of the flexible substrate for receiving at least a signal outputted from the signal outputting units, wherein when the flexible substrate has a load applied thereon and each of the signal outputting units relative to the signal detectors has a displacement, each of the signal detectors detects a pressure and a shear force resulting from the load on the flexible substrate based on a strength or an orientation of the signal received from the signal outputting units, and the signal outputting units are radiators for absorbing a light from a light source to radiate a light signal to the signal detectors;
    a filter disposed between the radiators and the signal detectors for reflecting the light to the radiators and transmitting the light signal radiated by the radiator to the signal detectors; and
    a collimator disposed between the light source and the filter for correcting an optical path between the light source and the filter.

2. The pressure and shear force measurement device of claim 1, wherein the plurality of signal detectors detect a distribution of the pressure and the shear force resulting from the load on the flexible substrate.

3. A pressure and shear force measurement method, comprising steps of:
    (1) disposing in a flexible substrate a plurality of signal outputting units for outputting signals, disposing a plurality of signal detectors at a periphery of the flexible substrate, disposing a filter between radiators and the signal detectors for reflecting a light to the radiators and transmitting a light signal radiated by the radiator to the signal detectors, and disposing a collimator between a light source and the filter for correcting an optical path between the light source and the filter, wherein the signal outputting units are the radiators for absorbing the light from the light source to radiate the light signal to the signal detectors;

(2) producing a displacement of each of the signal outputting units relative to the signal detectors when the flexible substrate has a load applied thereon; and (3) receiving a strength or an orientation of signals outputted from the signal outputting units by the plurality of signal detectors, and detecting a pressure and a shear force resulting from the load on the flexible substrate based on the signal received by the signal outputting units.

4. The pressure and shear force measurement method of claim 3, wherein the step (3) further comprises detecting the pressure and the shear force resulting from the load on the flexible substrate based on the signal received from the radiators.

5. The pressure and shear force measurement method of claim 3, wherein the step (3) further comprises detecting a distribution of the pressure and the shear force resulting from the load on the flexible substrate based on the signal received by the signal outputting units.

* * * * *